June 19, 1923.

E. A. PARKER ET AL

DETACHABLE TIRE TREAD

Filed Aug. 23, 1921

Inventors:
Edwin A. Parker
Harry G. Evitt
By Chafin a Ferguson
Attorney

Patented June 19, 1923.

1,459,376

UNITED STATES PATENT OFFICE.

EDWIN A. PARKER AND HARRY G. EVITT, OF BALTIMORE, MARYLAND.

DETACHABLE TIRE TREAD.

Application filed August 23, 1921. Serial No. 494,457.

*To all whom it may concern:*

Be it known that we, EDWIN A. PARKER and HARRY G. EVITT, citizens of the United States, residing at Baltimore, in the State of Maryland, have invented certain new and useful Improvements in Detachable Tire Treads, of which the following is a specification.

Our invention relates to improvements in detachable tire treads and has for its object to provide a tread for pneumatic tires which may be easily removed from the tire and replaced by a new one when desired.

A further object of the invention is to provide the detachable tire tread with a series of suction holes or apertures by means of which the tread will be held securely in position after being placed on the tire.

The invention consists of the novel construction and arrangement of the parts hereinafter more fully set forth in the following specification and pointed out in detail in the appended claims.

Referring to the accompanying drawing:—

Figure 1:
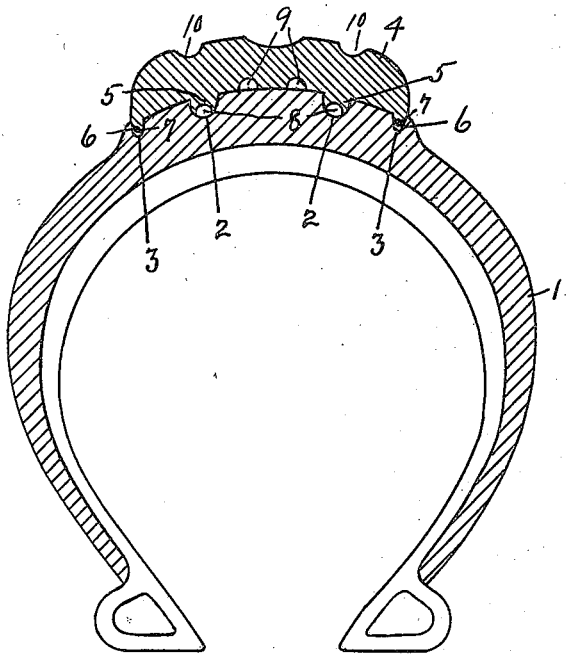
Figure 1 is a transverse section through the tire showing the position of the detachable tread thereon.
Figure 2:
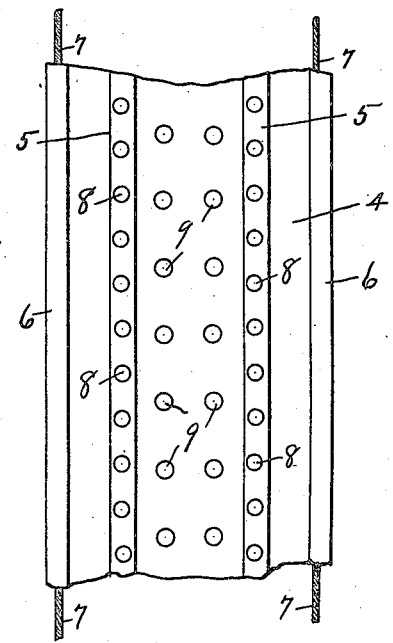
Figure 2 is an inverted plan view of a portion of the detachable tread.

Referring to the accompanying drawings, forming part of this specification, and in which like reference numerals designate like parts throughout the several views thereof, 1 designates a tire which is provided with circumferential grooves 2 and 3. The detachable tread 4 is provided on its inner surface with circumferential beads 5 which fit into the grooves 2 and beads 6 which fit into the grooves 3. The said beads 6 are provided with a wire 7 to hold them securely in position in the grooves 3 thereby preventing dirt or sand from working between the tire and detachable tread. The beads 2 are provided with suction apertures 8 and the tread 4 is provided with suction apertures 9. The suction apertures 8 and 9 prevent the detachable tread 4 from creeping on the casing and also hold it securely thereon. The outer surface of the tread 4 is provided with grooves 10 to prevent skidding. The said outer surface of the detachable tread 4 may be provided with any other shaped groove to make the same rough in order to prevent skidding. The tread is forced over the tire when the latter is deflated and secured in the position shown in Fig. 1. The suction holes 8 and 9 secure the tread in position and the beads 2 will prevent sidewise movement of the tread. The beads 6 being reinforced by the wire 7 will assist in holding the tire in position and also prevent sand or dirt from working between the tire and detachable tread.

Figure 3:
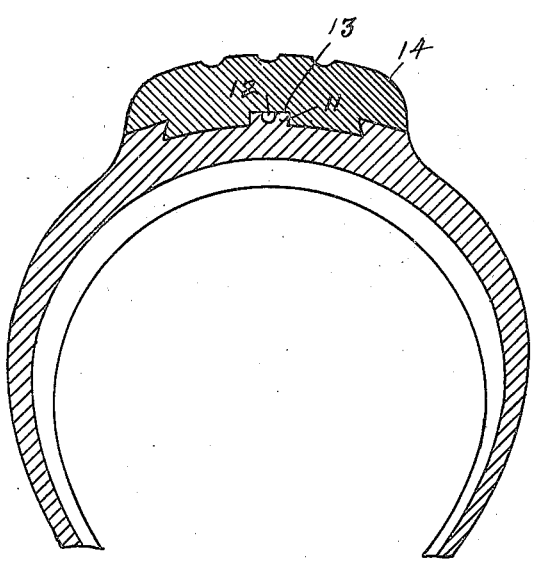
Figure 3 is a transverse section showing a modification of the detachable tread.
Figure 4:
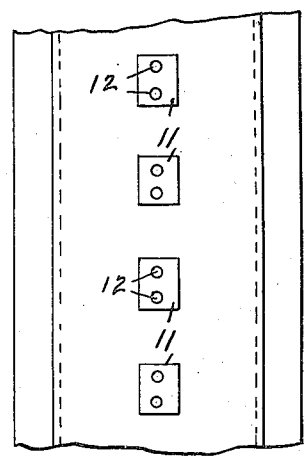
Figure 4 is a plan view of a portion of the tire shown in Fig. 3 with the detachable tread removed.

In Figs. 3 and 4 we have shown a modification in which the tire is provided on its periphery with a number of lugs 11 having suction holes 12 therein and which said lugs fit into the recesses 13 in the detachable tread 14.

It will thus be seen that when the detachable tread 4 has been worn the same can be readily removed by deflating the tire 1 and a new tread secured in position on the tire in place of the one which has been removed, thereby greatly increasing the life and usefulness of the tire.

Slight alterations in the construction and arrangement of the parts may be made with the scope of the appended claims without departing from the spirit of our present invention.

Having thus described our invention what we claim is:—

1. The combination with a tire having recesses in the periphery thereof, of a detachable tread having beads on its inner surface adapted to fit into the recesses of the tire, and a number of suction apertures in its inner surface to prevent said detachable tread from creeping on the tire casing.

2. The combination with a tire shoe having a peripheral groove therein, of a rubber annular tread removably located in said groove and having means for producing a suctional vacuum between its interior and the tire shoe.

In testimony whereof we affix our signatures.

EDWIN A. PARKER.
HARRY G. EVITT.